(12) United States Patent
Haga et al.

(10) Patent No.: US 11,594,946 B2
(45) Date of Patent: Feb. 28, 2023

(54) AXIAL GAP MOTOR

(71) Applicant: TOYOTA JIDOSHA KABUSHIKI KAISHA, Toyota (JP)

(72) Inventors: Kazuaki Haga, Toyota (JP); Keiu Kanada, Miyoshi (JP); Kensuke Komori, Toyota (JP); Masaaki Ito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 17/203,903

(22) Filed: Mar. 17, 2021

(65) Prior Publication Data

US 2021/0328489 A1    Oct. 21, 2021

(30) Foreign Application Priority Data

Apr. 17, 2020   (JP) .............................. JP2020-073887

(51) Int. Cl.
*H02K 1/28*     (2006.01)
*H02K 21/24*    (2006.01)
*H02K 1/18*     (2006.01)
*H02K 1/2793*   (2022.01)

(52) U.S. Cl.
CPC ............. *H02K 21/24* (2013.01); *H02K 1/182* (2013.01); *H02K 1/2793* (2013.01); *H02K 1/28* (2013.01)

(58) Field of Classification Search
CPC ........ H02K 21/24; H02K 1/28; H02K 1/2793; H02K 1/2795; H02K 1/141; H02K 1/143
USPC .......................................... 310/49.02, 216.023
See application file for complete search history.

(56) References Cited

U.S. PATENT DOCUMENTS 6,043,579 A  *  3/2000  Hill ...................... H02K 21/24
                                                    310/164
2020/0153293 A1*  5/2020  Huang ................ H02K 1/2793

FOREIGN PATENT DOCUMENTS

CN    105827027 A  *  8/2016  ............... H02K 1/02
JP    2018033281 A     3/2018

OTHER PUBLICATIONS

Machine Translation of CN 105827027 A (Year: 2016).*
Keiu Kanada et al., U.S. Appl. No. 17/227,653, filed Apr. 12, 2021.

* cited by examiner

*Primary Examiner* — Dang D Le
(74) *Attorney, Agent, or Firm* — Dickinson Wright, PLLC (57) ABSTRACT

An axial gap motor is configured such that: a rotor includes a plurality of rotor cores fixed along the circumferential direction of a rotor pedestal, and a plurality of magnets; and a stator includes a plurality of stator cores fixed along the circumferential direction of a stator pedestal, and coils wound around the stator cores. A first divided surface of each rotor core faces an N-pole of a corresponding magnet, and a second divided surface of the each rotor core faces an S-pole of a corresponding magnet. Respective divided surfaces of the rotor cores are placed to face respective divided surfaces of the stator cores across the magnets.

4 Claims, 6 Drawing Sheets

AXIAL GAP MOTOR

CROSS-REFERENCE TO RELATED APPLICATION

This application claims priority to Japanese Patent Application No. 2020-073887 filed on Apr. 17, 2020, incorporated herein by reference in its entirety.

BACKGROUND

1. Technical Field

The present disclosure relates to an axial gap motor including a rotor fixed to a rotary shaft, and a stator placed to face the rotor via a gap in the axial direction of the rotary shaft.

2. Description of Related Art

In the related art, there has been known an axial gap motor including a rotor fixed to a rotary shaft, and a stator placed to face the rotor via a gap in the axial direction of the rotary shaft (e.g., see Japanese Unexamined Patent Application Publication No. 2018-33281 (JP 2018-33281 A)). JP 2018-33281 A describes an axial gap motor including a rotor fixed to a rotating shaft (a rotary shaft), and stators placed to face the rotor via a gap in the axial direction of the rotating shaft such that the rotor is sandwiched between the stators. The rotor includes a rotor frame (a rotor pedestal), and a plurality of magnet pieces fixed along the circumferential direction of the rotor frame. The stator includes a plurality of cut cores (stator cores) placed along the circumferential direction, and winding wires wound around the cut cores. The cut core is formed by dividing a winding core formed such that a belt-shaped magnetic material is wound several times. The cut core of each stator is placed such that divided surfaces of the cut core face respective magnet pieces of the rotor via a gap.

SUMMARY

However, in the axial gap motor of JP 2018-33281 A, the distance between an N-pole and an S-pole of each magnet piece provided in the rotor corresponds to only the thickness of the rotor pedestal, and therefore, a large demagnetizing field occurs in the magnet pieces. This demagnetizes the magnet pieces, and therefore, such a problem occurs that output torque decreases.

Further, in JP 2018-33281 A, the magnet pieces of the rotor pass between respective stator cores of two stators. At this time, when two stator cores repel a magnet piece, that is, when the two stator cores face a magnet piece at the same magnetic pole, the magnet piece is demagnetized.

The present disclosure is accomplished in view of such points, and an object of the present disclosure is to provide an axial gap motor that can restrain demagnetization of a magnet and can restrain a decrease in output torque.

An axial gap motor according to the present disclosure includes a rotor and a stator. The rotor is fixed to a rotary shaft. The stator is placed to face the rotor via a gap in an axial direction of the rotary shaft. The rotor includes a rotor pedestal made of a nonmagnetic material, and a plurality of rotor cores fixed along a circumferential direction of the rotor pedestal and a plurality of magnets fixed along the circumferential direction of the rotor pedestal. The stator includes a stator pedestal made of a nonmagnetic material, a plurality of stator cores fixed along a circumferential direction of the stator pedestal, and coils wound around the stator cores. The rotor cores and the stator cores are cores each made of a soft magnetic material curved such that two end surfaces face the same direction. Two end surfaces of each of the rotor cores are placed to face two end surfaces of a corresponding one of the stator cores. The magnets are each placed such that an N-pole and an S-pole are arranged in a thickness direction of the rotor pedestal. One of the two end surfaces of the each of the rotor cores faces the N-pole of a corresponding one of the magnets. The other one of the two end surfaces of the each of the rotor cores faces the S-pole of a corresponding one of the magnets.

With the axial gap motor of the present disclosure, one of the two end surfaces of each of the rotor cores faces the N-pole of its corresponding one of the magnets, and the other one of the two end surfaces of the each of the rotor cores faces the S-pole of its corresponding one of the magnets. Hereby, magnetic flux emitted from the N-pole of a first magnet enters the S-pole of a second magnet through the rotor core, and thus, it can be considered that two magnets and the rotor core constitute one U-shaped magnet. On this account, the U-shaped magnet has a longer distance between the N-pole and the S-pole than that of each magnet, so that a demagnetizing field generated in the magnet becomes small. Hereby, demagnetization of the magnet is restrained, thereby making it possible to restrain a decrease in output torque.

Further, in the axial gap motor, when the magnets face the stator cores at the same magnetic pole due to the rotation of the rotor, one magnet is demagnetized only by one stator core. On this account, in comparison with a case where one magnet is demagnetized by two stator cores as described in JP 2018-33281 A, it is possible to restrain the magnet from being demagnetized.

In the axial gap motor, the rotor may include two rotors. The stator may include two stators. The two rotors may be placed between the two stators in the axial direction of the rotary shaft. Parts of respective rotor cores of the two rotors may be fixed to each other, the parts being on respective sides opposite to respective end surfaces of the respective rotor cores. With such a configuration, when the rotor cores are drawn to respective stator cores, a force by which one of the rotors is drawn to its corresponding stator and a force by which the other one of the rotors is drawn to its corresponding stator work to cancel each other. This makes it possible to restrain the rotors from making contact with the stators due to bending of the rotor pedestals. Further, it is possible to improve output torque with respect to a motor size in comparison with a case where one rotor and one stator are provided.

In the axial gap motor, the rotor cores and the stator cores may be cores each having the two end surfaces formed by dividing a winding body in a direction intersecting with a circumferential direction of the winding body, the winding body being formed by winding a belt-shaped soft magnetic material several times. The belt-shaped soft magnetic material may be made of a directional electromagnetic steel sheet in which crystals are oriented in a longitudinal direction of the belt-shaped soft magnetic material. The saturation magnetic flux density of the directional electromagnetic steel sheet is higher than the saturation magnetic flux density of a non-directional electromagnetic steel sheet. Accordingly, with the use of the rotor cores and the stator cores each made of the directional electromagnetic steel sheet, it is possible to increase output torque of the axial gap motor in comparison with a case where rotor cores and stator cores each made of the non-directional electromagnetic steel sheet are used.

Note that, in the present specification and Claims, the directional electromagnetic steel sheet indicates an electromagnetic steel sheet in which crystals are oriented in a specific direction (a rolling direction) so that the electromagnetic steel sheet has an easy axis of magnetization in that direction. Further, the width direction of the belt-shaped soft magnetic material indicates a short direction, and a direction where the belt-shaped soft magnetic material extends indicates a longitudinal direction.

With the disclosure, it is possible to provide an axial gap motor that can restrain demagnetization of magnets and can restrain a decrease in output torque.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
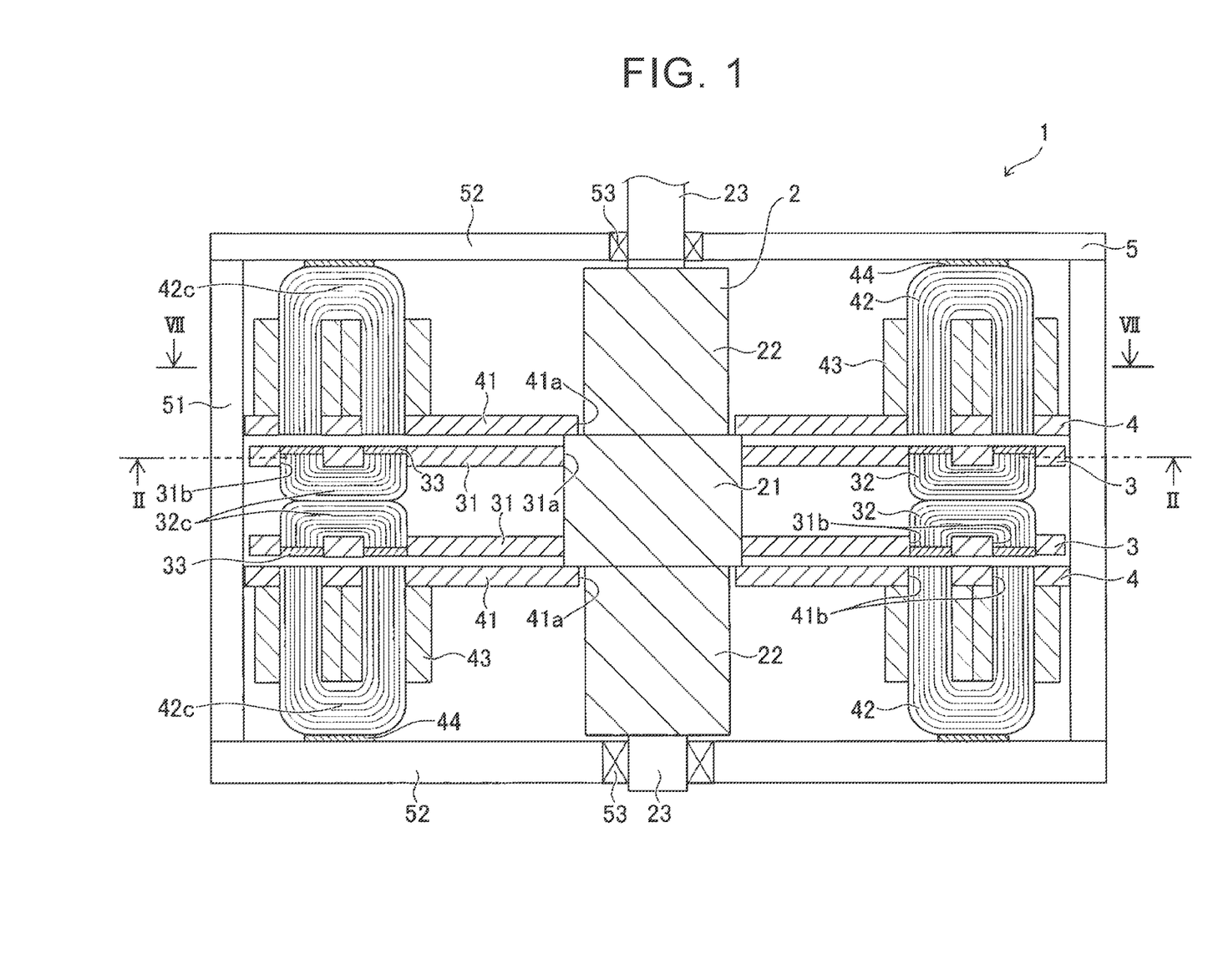
FIG. 1 is a schematic sectional view illustrating an overall configuration of an axial gap motor according to one embodiment of the present disclosure.

The following describes an axial gap motor 1 according to one embodiment of the present disclosure with reference to the drawings. FIG. 1 is a schematic sectional view illustrating an overall configuration of the axial gap motor 1 according to one embodiment of the present disclosure.

As illustrated in FIG. 1, the axial gap motor 1 is constituted by a rotary shaft 2, a rotor 3 fixed to the rotary shaft 2, a stator 4 placed to face the rotor 3 via a gap in the axial direction of the rotary shaft 2, and a case 5 in which they are accommodated. The following describes an example in which two rotors 3 are placed to be sandwiched between two stators 4, and the rotors 3 and the stators 4 are formed symmetrically in the axial direction.

The case 5 includes a cylindrical side face portion 51 and a pair of discoid cover portions 52 provided such that the cover portions 52 close respective openings at the opposite ends of the side face portion 51. Bearing members 53 configured to rotatably support the rotary shaft 2 are attached to respective central parts of the cover portions 52.

The material of the case 5 is not limited in particular. However, from the viewpoint of mechanical strength and heat dissipation properties, it is preferable that the case 5 be made of metal.

The rotary shaft 2 includes: a large-diameter portion 21 placed in a central part of the case 5 in the axial direction; a pair of intermediate-diameter portions 22 having a diameter smaller than that of the large-diameter portion 21, the intermediate-diameter portions 22 being placed on the opposite sides of the large-diameter portion 21 in the axial direction; and a pair of small-diameter portions 23 having a diameter smaller than that of the intermediate-diameter portions 22. One of the small-diameter portions 23 is placed on a first side of one of the intermediate-diameter portions 22 in the axial direction, and the other one of the small-diameter portions 23 is placed on a second side of the other one of the intermediate-diameter portions 22 in the axial direction. The small-diameter portions 23 are rotatably supported by respective bearing members 53 in a pivoting manner.

Figure 2:
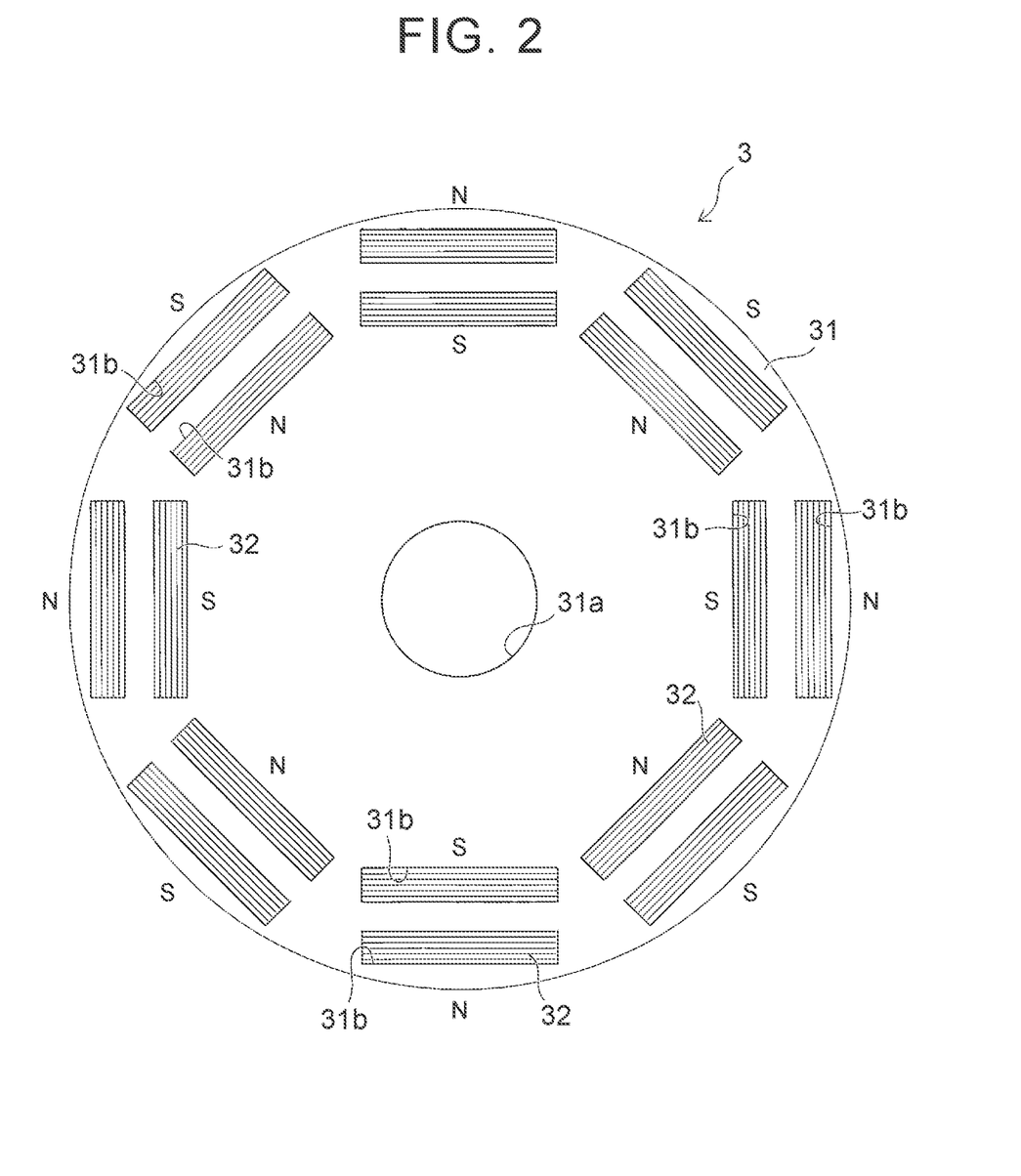
FIG. 2 is a sectional view illustrating a structure of a rotor along a line II-II in FIG. 1.

As illustrated in FIGS. 1, 2, the rotor 3 is constituted by a discoid rotor pedestal 31 made of a nonmagnetic material, a plurality of rotor cores 32 (herein, eight rotor cores 32) fixed along the circumferential direction of the rotor pedestal 31, and a plurality of permanent magnets (hereinafter also just referred to as magnets) 33 placed such that the permanent magnets 33 make contact with or are adjacent to the rotor cores 32.

The material of the rotor pedestal 31 is not limited in particular, provided that the rotor pedestal 31 is made of a nonmagnetic material, and metal or resin can be used. From the viewpoint of mechanical strength, nonmagnetic stainless steel can be used, for example. In a central part of the rotor pedestal 31, an insertion hole 31a into which the large-diameter portion 21 of the rotary shaft 2 is inserted in a fixed manner is formed. Further, the rotor pedestal 31 is configured to rotate together with the rotary shaft 2 in an integrated manner. In this case, for example, the rotor pedestal 31 may be fixed to the rotary shaft 2 such that a keyway is formed by an inner peripheral surface of the insertion hole 31a and an outer peripheral surface of the large-diameter portion 21 of the rotary shaft 2, and a key is fitted into the keyway. Alternatively, the large-diameter portion 21 of the rotary shaft 2 may be fixed to the insertion hole 31a of the rotor pedestal 31 by press-fitting. A plurality of through-holes 31b is formed in an outer peripheral part of the rotor pedestal 31 so as to penetrate the rotor pedestal 31 in its thickness direction. The magnets 33 and respective end parts of the rotor cores 32 are embedded in the through-holes 31b. A pair of through-holes 31b is provided for one rotor core 32 such that the through-holes 31b are adjacent to each other in the radial direction of the rotor pedestal 31. The through-holes 31b are formed at an equal angle pitch around the insertion hole 31a (the rotary shaft 2). Here, eight pairs of through-holes 31b are formed at a pitch of 45°. Note that an outer peripheral edge of the rotor pedestal 31 is formed to have a predetermined gap from an inner surface of the side face portion 51 of the case 5.

Figure 4:
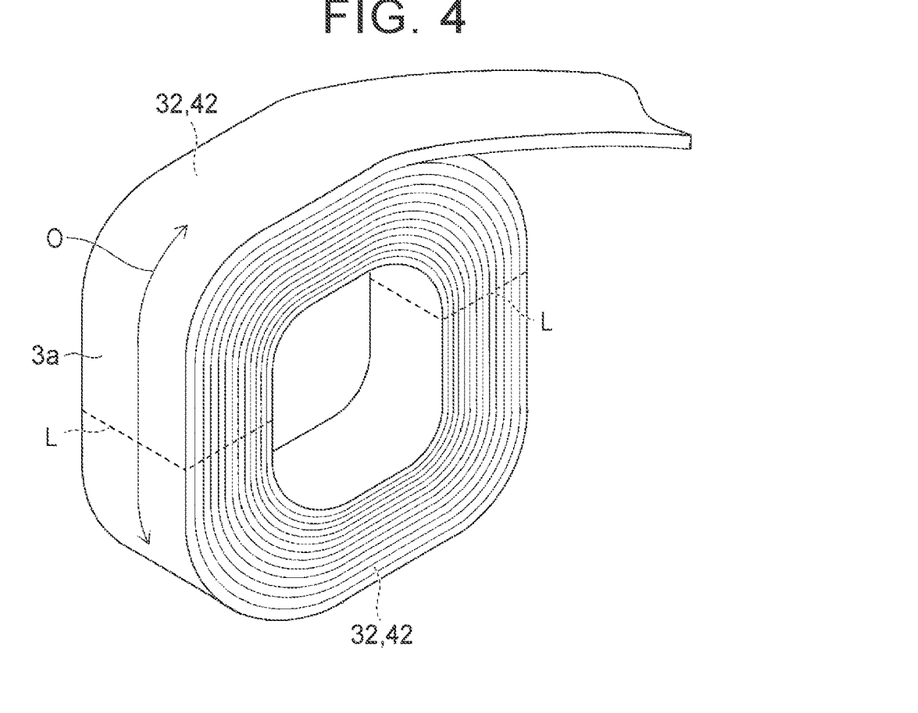
FIG. 4 is a perspective view to describe a manufacturing method of the rotor core and the stator core of the axial gap motor according to one embodiment of the present disclosure.

The material of the rotor core 32 is not limited in particular, provided that the rotor core 32 is made of a soft magnetic material. For example, a directional or non-directional electromagnetic steel sheet, iron-based soft magnetic amorphous, cobalt-based soft magnetic amorphous, a nanocrystalline soft magnetic material, and so on can be used. However, it is preferable to use a directional electromagnetic steel sheet. The rotor core 32 is constituted by a cut core formed in a U-shape. As illustrated in FIG. 4, the rotor core 32 is formed such that a winding body 3a formed by winding a belt-shaped soft magnetic material (directional electromagnetic steel sheet) several times is divided in a direction intersecting with the circumferential direction (an arrow-O direction). Note that a reference sign L in FIG. 4 indicates a dividing position of the winding body 3a.

Figure 3:
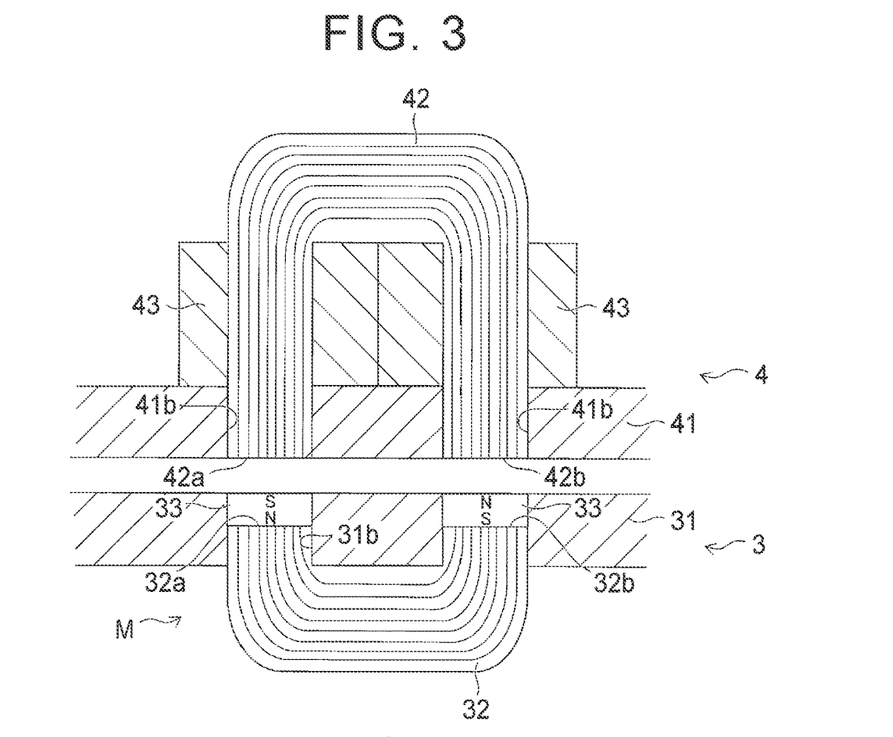
FIG. 3 is a sectional view illustrating a structure around a rotor core and a stator core of the axial gap motor according to one embodiment of the present disclosure.

As illustrated in FIG. 3, the rotor core 32 has two divided surfaces (end surfaces) 32a, 32b. The two divided surfaces 32a, 32b are formed to face the same direction, and here, the two divided surfaces 32a, 32b are formed on the same plane. The rotor core 32 is placed such that the divided surfaces 32a, 32b enter respective through-holes 31b in the rotor pedestal 31. Further, in the present embodiment, in the directional electromagnetic steel sheet used for the rotor core 32, crystals are oriented in the longitudinal direction (the rolling direction) of the directional electromagnetic steel sheet, so that the directional electromagnetic steel sheet has an easy axis of magnetization in that direction. Accordingly, the rotor core 32 has an excellent magnetic property as will be described later.

Further, the divided surfaces 32a, 32b of the rotor core 32 are arranged in the radial direction of the rotor pedestal 31. In the present embodiment, the winding width direction (the width direction of the belt shape) of the rotor core 32 is parallel to the circumferential direction of the rotor pedestal 31. In other words, the lamination direction of the belt-shaped soft magnetic material on the divided surfaces 32a, 32b of the rotor core 32 is parallel to the radial direction of the rotor pedestal 31.

The material of the magnets 33 is not limited in particular, but a neodymium magnet, a samarium cobalt magnet, an alnico magnet, a ferrite magnet, and so on can be used, for example. Here, a neodymium magnet is used. A pair of magnets 33 is provided for one rotor core 32. The magnet 33 is placed to be flush with a surface, on the stator 4 side, of the rotor pedestal 31 in a state where the magnet 33 is embedded in the through-hole 31b of the rotor pedestal 31. The magnet 33 is formed to be thinner than the rotor pedestal 31. In a state where the magnet 33 is placed in the through-hole 31b of the rotor pedestal 31, a space where the end part of the rotor core 32 is placed is formed in the through-hole 31b.

Further, as illustrated in FIG. 3, the magnet 33 is placed such that its N-pole and its S-pole are arranged in the thickness direction of the rotor pedestal 31, and the divided surfaces 32a, 32b of one rotor core 32 face different poles (the N-pole and the S-pole). That is, the magnets 33 adjacent to each other in the radial direction are placed such that the N-pole and the S-pole of one of the magnets 33 are placed to be reverse to those of the other one of the magnets 33. Further, as illustrated in FIG. 2, the magnets 33 adjacent to each other in the circumferential direction are also placed such that their N-poles and S-poles are reverse to each other. That is, the magnets 33 are placed such that their N-poles and S-poles are placed alternately in the circumferential direction.

As illustrated in FIG. 3, the divided surfaces 32a, 32b of the rotor core 32 are inserted into respective through-holes 31b (respective spaces as described above), so that the divided surfaces 32a, 32b make contact with respective magnets 33 or are placed to be adjacent to the respective magnets 33. In this state, magnetic flux emitted from the N-pole of one of the respective magnets 33 enters the S-pole of the other one of the respective magnets 33 through the rotor core 32. Thus, it can be considered that two magnets 33 and the rotor core 32 constitute one U-shaped magnet M. On this account, the magnet M has a longer distance between its N-pole and its S-pole than that of each magnet 33, so that a demagnetizing field caused in the magnet M becomes small. Hereby, demagnetization of the magnet M is restrained, thereby making it possible to restrain a decrease in output torque.

Here, in the present embodiment, as illustrated in FIG. 1, two rotors 3 are provided. The rotors 3 are placed such that respective rotor cores 32 of the rotors 3 face each other. Respective parts 32c (parts where the respective rotor cores 32 face each other; hereinafter also referred to as back surface portions 32c) of the respective rotor cores 32 of the rotors 3 are fixed to each other. The respective parts 32c are on respective sides opposite to the divided surfaces 32a, 32b in the respective rotor cores 32. Hereby, the rotor cores 32 corresponding to each other in the two rotors 3 are placed at the same angular position (so that no phase difference is caused).

Figure 5:
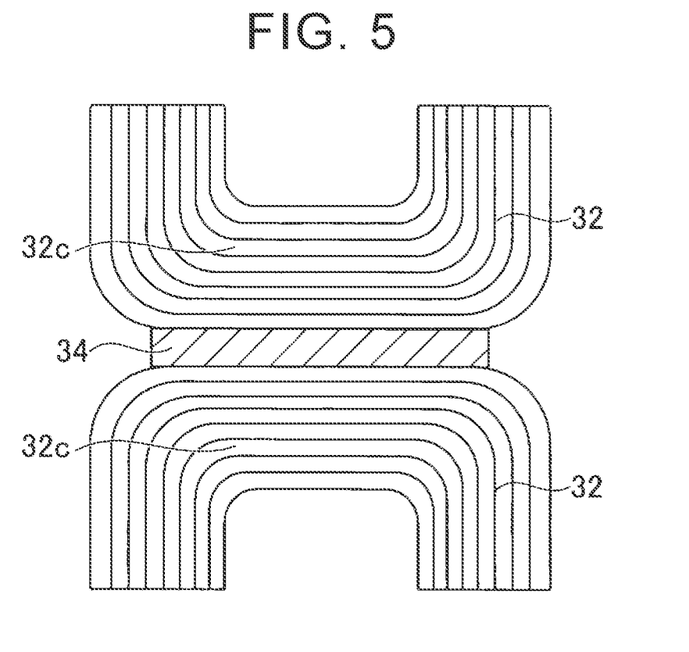
FIG. 5 is a side view to describe a fixation method for fixing rotor cores to each other in the axial gap motor according to one embodiment of the present disclosure.
Figure 6:
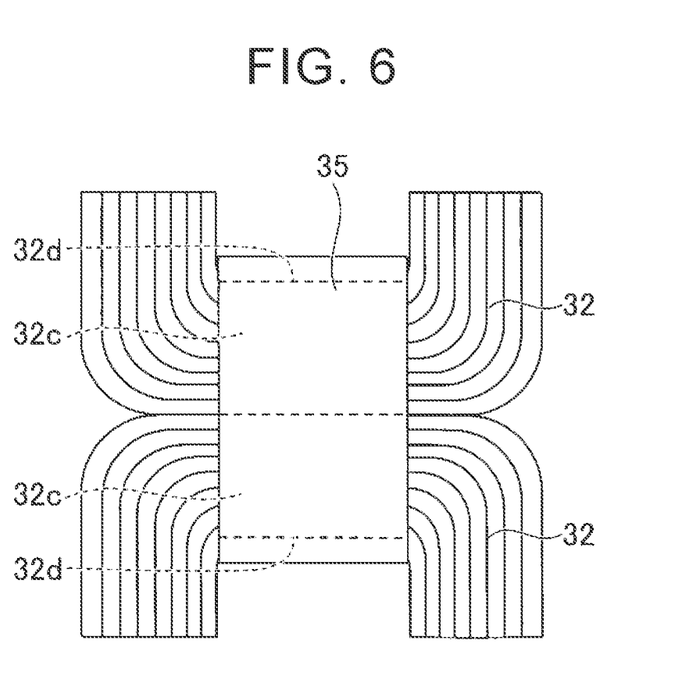
FIG. 6 is a side view to describe a fixation method for fixing rotor cores to each other in the axial gap motor according to one embodiment of the present disclosure.

A method for fixing the rotor cores 32 to each other is not limited in particular. For example, as illustrated in FIG. 5, the back surface portions 32c of the rotor cores 32 may be fixed by welding or may be fixed by bonding by use of an adhesive (a reference sign 34 in FIG. 5 indicates a welded portion or the adhesive). Further, as illustrated in FIG. 6, before the rotor cores 32 are attached to respective rotor pedestals 31, two rotor cores 32 may be fixed such that a belt 35 made of resin is wound to cover inner surfaces 32d of the back surface portions 32c of the two rotor cores 32. Note that a metal belt may be used as the belt 35. However, there is such a possibility that eddy current may be caused in the metal belt itself or belts adjacent to each other in the circumferential direction of the rotor pedestal 31 may come into contact with each other such that the belts are conductive to each other. In view of this, it is preferable to use a belt made of resin. Since the rotor cores 32 of the two rotors 3 are fixed to each other as such, when the rotor cores 32 are drawn to respective stator cores 42, an axial force by which one of the rotors 3 is drawn to its corresponding one of the stators 4 and an axial force by which the other one of the rotors 3 is drawn to its corresponding one of the stators 4 work to cancel each other. This makes it possible to restrain the rotors 3 from making contact with the stators 4 due to bending of the rotor pedestals 31.

Figure 7:
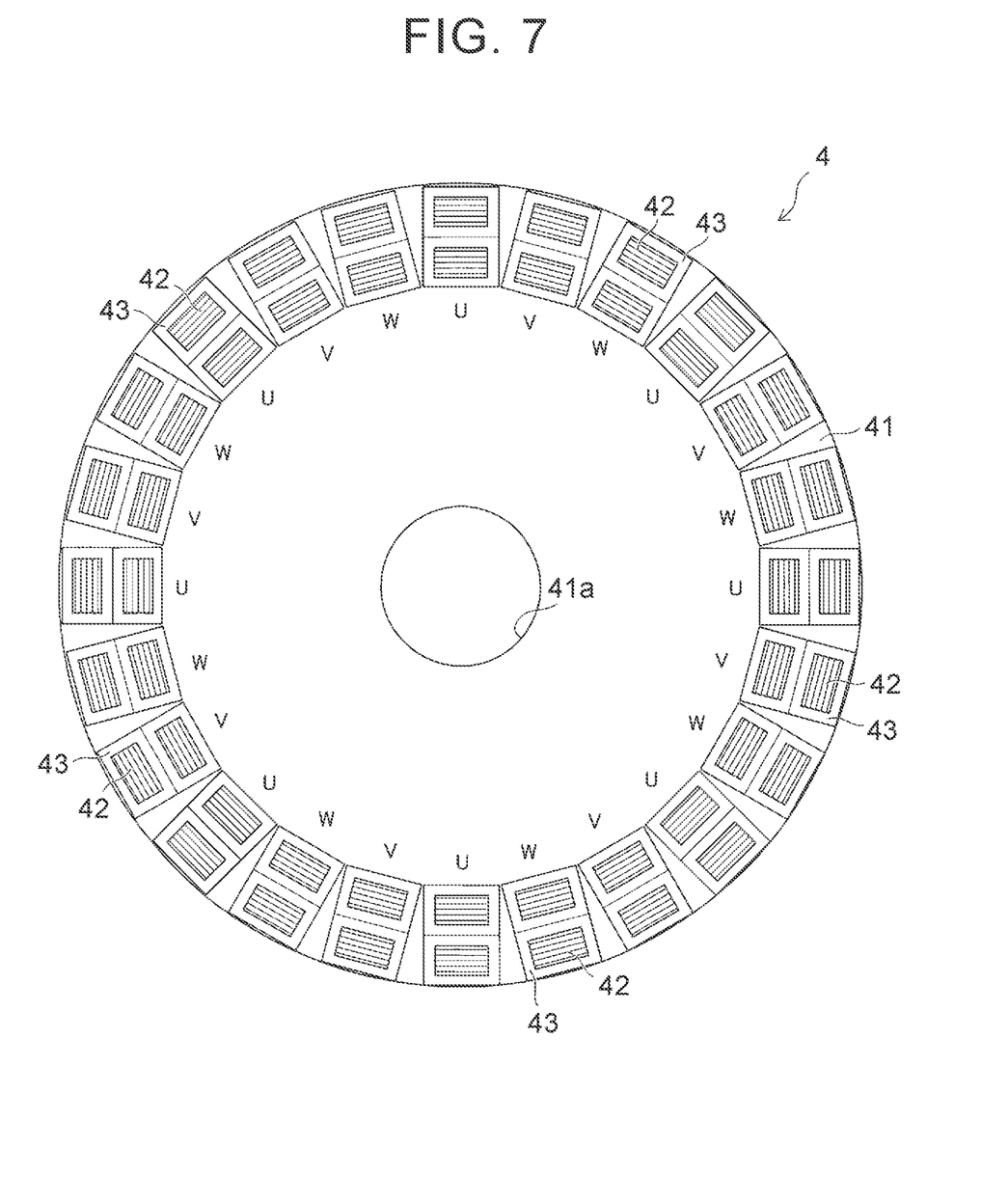
FIG. 7 is a sectional view illustrating a structure of a stator along a line VII-VII in FIG. 1.

As illustrated in FIGS. 1, 7, the stator 4 is constituted by a discoid stator pedestal 41 made of a nonmagnetic material, a plurality of stator cores 42 (herein, 24 stator cores 42) fixed along the circumferential direction of the stator pedestal 41, and coils 43 wound around the stator cores 42. Note that, in the present embodiment, the stator cores 42 corresponding to each other in two stators 4 are placed at the same angular position (so that no phase difference is caused).

The material of the stator pedestal 41 is not limited in particular, provided that the stator pedestal 41 is made of a nonmagnetic material. From the viewpoint of mechanical strength, nonmagnetic stainless steel can be used, for example. In a central part of the stator pedestal 41, an insertion hole 41a into which the intermediate-diameter portion 22 of the rotary shaft 2 is inserted is formed. Note that an inner surface of the insertion hole 41a of the stator pedestal 41 is formed to have a predetermined gap from the intermediate-diameter portion 22 of the rotary shaft 2. Further, the inside diameter of the insertion hole 41a of the stator pedestal 41 is formed to be smaller than the outside diameter of the large-diameter portion 21 of the rotary shaft 2. As a result, the movement of the central part of the stator pedestal 41 toward the rotor 3 side is restricted by the large-diameter portion 21, thereby making it possible to prevent the stator pedestal 41 from making contact with the rotor pedestal 31.

A plurality of through-holes 41b is formed in an outer peripheral part of the stator pedestal 41 so as to penetrate the stator pedestal 41 in its thickness direction. Respective end parts of the stator cores 42 are fitted into the through-holes 41b. A pair of through-holes 41b is provided for one stator core 42 such that the through-holes 41b are adjacent to each other in the radial direction of the stator pedestal 41. The through-holes 41b are formed at an equal angle pitch around the insertion hole 41a (the rotary shaft 2). Here, 24 pairs of through-holes 41b are formed at a pitch of 15°. Note that an outer peripheral edge of the stator pedestal 41 is fixed to the inner surface of the side face portion 51 of the case 5. Further, the stator pedestal 41 is configured so as not to rotate relative to the case 5. In this case, for example, the stator pedestal 41 may be fixed to the case 5 such that a keyway is formed by the outer peripheral edge of the stator pedestal 41 and the inner peripheral surface of the side face portion 51 of the case 5, and a key is fitted into the keyway, or the outer peripheral edge of the stator pedestal 41 may be fixed to the inner peripheral surface of the side face portion 51 of the case 5 by press-fitting.

The material of the stator core 42 is not limited in particular, provided that the stator core 42 is made of a soft magnetic material. For example, a directional or non-directional electromagnetic steel sheet, iron-based soft magnetic amorphous, cobalt-based soft magnetic amorphous, a nanocrystalline soft magnetic material, and so on can be used. However, it is preferable to use a directional electromagnetic steel sheet. The stator core 42 is constituted by a cut core formed in a U-shape. As illustrated in FIG. 4, the stator core 42 is formed such that the winding body 3a formed by winding a belt-shaped soft magnetic material (directional electromagnetic steel sheet) several times is divided in the direction intersecting with the circumferential direction (the arrow-O direction). At this time, two stator cores 42 (or rotor cores 32) may be formed from one winding body 3a, or one stator core 42 and one rotor core 32 may be formed from one winding body 3a. In the present embodiment, the rotor core 32 and the stator core 42 are formed by dividing the winding body 3a formed by winding a belt-shaped soft magnetic material several times, and therefore, it is possible to greatly improve the yields of the rotor core 32 and the stator core 42 in comparison with a case where a core is formed by punching a sheet-shaped electromagnetic steel sheet as generally employed for the manufacture of a radial gap motor.

Note that a method for forming the rotor core 32 and the stator core 42 is not limited to the above method. For example, a core may be formed such that belt-shaped soft magnetic materials are curved into a U-shape and laminated in a plurality of layers. Further, instead of laminating the belt-shaped soft magnetic materials, a core may be formed by other methods such as sintering or casting, for example.

As illustrated in FIG. 3, the stator core 42 has two divided surfaces (end surfaces) 42a, 42b facing the same direction. The divided surfaces 42a, 42b of the stator core 42 are inserted into respective through-holes 41b in a fixed manner such that the divided surfaces 42a, 42b are flush with a surface, on the rotor 3 side, of the stator pedestal 41. Further, in the present embodiment, since the stator core 42 is made of a directional electromagnetic steel sheet, the stator core 42 has an excellent magnetic property as will be described later.

Further, the divided surfaces 42a, 42b of the stator core 42 are arranged in the radial direction of the stator pedestal 41. In the present embodiment, the winding width direction (the width direction of the belt shape) of the stator core 42 is parallel to the circumferential direction of the stator pedestal 41. In other words, the lamination direction of the belt-shaped soft magnetic material on the divided surfaces 42a, 42b of the stator core 42 is parallel to the radial direction of the stator pedestal 41.

Further, as illustrated in FIG. 1, a part (hereinafter also referred to as a back surface portion) 42c of the stator core 42 on a side opposite to the rotor core 32 is fixed to an inner surface of the cover portion 52. A method for fixing the stator core 42 to the cover portion 52 is not limited in particular. However, the stator core 42 may be fixed to the cover portion 52 by welding or may be fixed by use of an adhesive (a reference sign 44 in FIG. 1 indicates a welded portion or the adhesive), for example.

Figure 8:
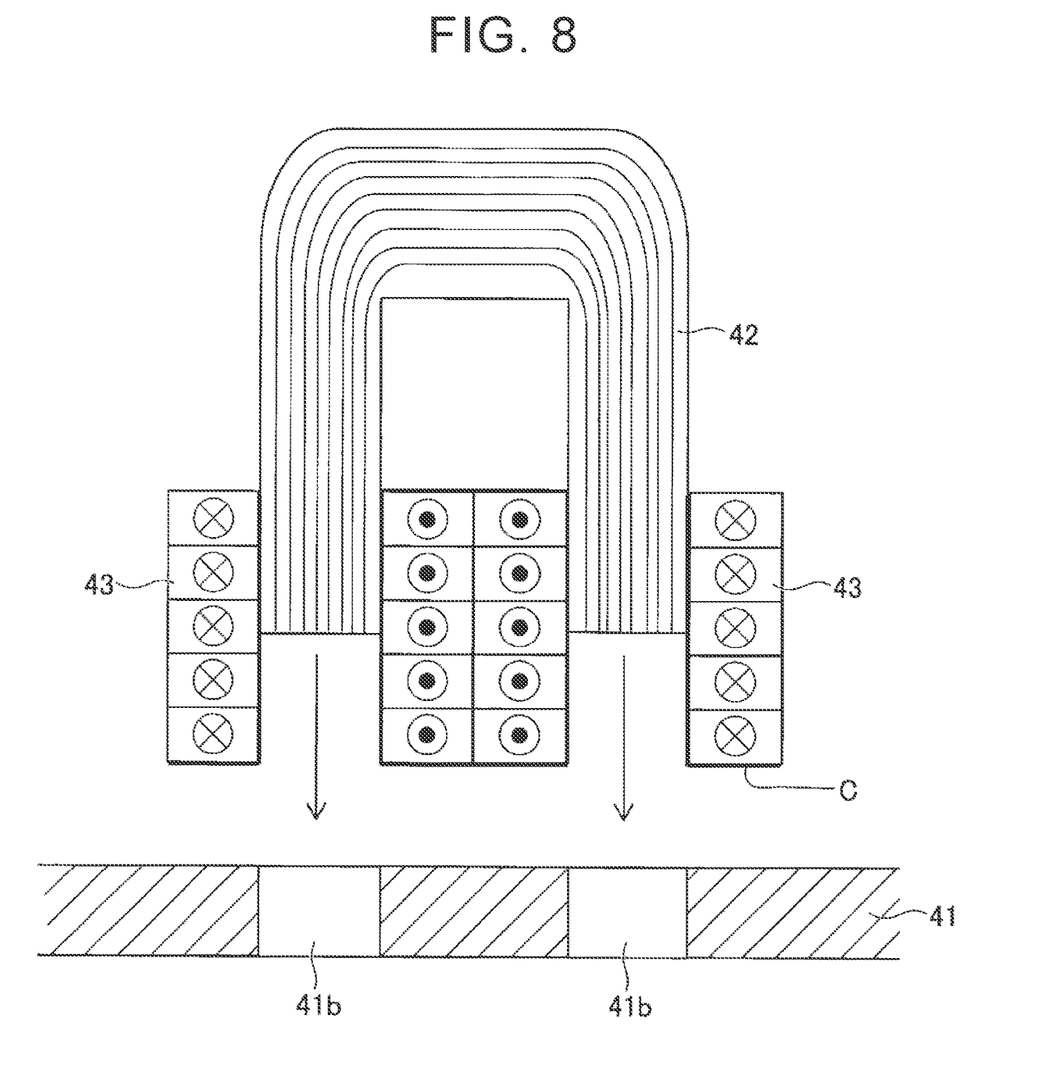
FIG. 8 is a sectional view to describe an attachment method for attaching coils to the stator core in the axial gap motor according to one embodiment of the present disclosure.

The coil 43 is formed by winding a lead wire several times. An insertion hole into which the stator core 42 is inserted is formed in a central part of the coil 43. When the stator 4 is to be assembled, two coils 43 connected in series to each other are placed side by side, and both end parts of the stator core 42 are inserted into respective insertion holes of the coils 43, as illustrated in FIG. 8. Then, the stator core 42 to which the coils 43 are attached is inserted into the through-holes 41b of the stator pedestal 41. Thus, the stator 4 is assembled. On this account, the stator 4 can be easily manufactured in comparison with a case where a coil is formed by winding a lead wire around a stator core formed by lamination in a plurality of layers like a radial gap motor. Note that, at the time when the stator core 42 is inserted into the insertion holes of the coils 43, the stator core 42 may be inserted in a state where the coils 43 are stored in a resin case or surfaces of the coils 43 are covered with insulating paper. Note that a reference sign C in FIG. 8 indicates the resin case or the insulating paper. With such a configuration, it is possible to improve assembly workability and to prevent the coils 43 adjacent to each other from being electrically conductive to each other. Further, the coil 43 can be formed in concentrated winding, for example, but the coil 43 may be formed in distributed winding.

Further, as illustrated in FIG. 7, the coils 43 attached to the stator cores 42 are provided such that a U-phase, a V-phase, and a W-phase are repeated along the circumferential direction of the stator pedestal 41. The coils 43 of the U-phase, the V-phase, and the W-phase are connected to a U-phase power supply (not shown), a V-phase power supply (not shown), and a W-phase power supply, respectively. Hereby, when a current is applied to the coils 43, magnetic flux is generated in the stator cores 42, and the magnets 33 of the rotor 3 are attracted to or repel the magnetic flux. Hereby, the rotor 3 rotates.

Next will be briefly described an effect obtained when the rotor core 32 and the stator core 42 are formed by use of a directional electromagnetic steel sheet.

A saturation magnetic flux density Bs (e.g., 1.9 T) of the directional electromagnetic steel sheet is 11% higher than a saturation magnetic flux density Bs (e.g., 1.7 T) of a non-directional electromagnetic steel sheet, for example. The output torque of the axial gap motor 1 is proportional to a product of a saturation magnetic flux density Bs of the rotor cores 32 and the stator cores 42 (that is, electromagnetic steel sheets) and a saturation magnetic flux density Bs of the magnets 33. On this account, in a case where the saturation magnetic flux density Bs of the magnets 33 is constant (e.g., 1.4 T), when the directional electromagnetic steel sheet is used, it is possible to increase the output torque by 11%, for example, in comparison with a case where the non-directional electromagnetic steel sheet is used.

In the present embodiment, as described above, a first magnet 33 is placed such that its N-pole faces the divided surface 32a of the rotor core 32, and a second magnet 33 is placed such that its S-pole faces the divided surface 32b of the rotor core 32. Hereby, magnetic flux emitted from the N-pole of the first magnet 33 enters the S-pole of the second magnet 33 through the rotor core 32, and thus, it can be considered that two magnets 33 and the rotor core 32 constitute one U-shaped magnet M. On this account, the U-shaped magnet M has a longer distance between the N-pole and the S-pole than that of each magnet 33, so that a demagnetizing field caused in the magnet M becomes small. Hereby, demagnetization of the magnet M is restrained, thereby making it possible to restrain a decrease in output torque.

Further, in the axial gap motor 1, when the magnets 33 face the stator cores 42 at the same magnetic pole due to the rotation of the rotor 3, one magnet 33 is demagnetized only by one stator core 42. On this account, in comparison with a case where one magnet is demagnetized by two stator cores as described in JP 2018-33281 A, it is possible to restrain the magnets 33 from being demagnetized. In the present embodiment, the two rotors 3 are demagnetized by the two stators 4. Even in this case, an influence caused by the demagnetization is small in comparison with the case where one magnet is demagnetized by two stator cores as described in JP 2018-33281 A.

Further, as described above, the rotors 3 and the stators 4 are placed symmetrically in the axial direction, and therefore, the rotor cores 32 can be fixed to each other. Accordingly, an axial force by which one of the rotors 3 is drawn to its corresponding one of the stators 4 and an axial force by which the other one of the rotors 3 is drawn to its corresponding one of the stators 4 work to cancel each other. This makes it possible to restrain the rotors 3 from making contact with the stators 4 due to bending of the rotor pedestals 31.

Further, the rotors 3 and the stators 4 may be placed alternately along the axial direction (more specifically, in order of a first rotor 3, a first stator 4, a second rotor 3, and a second stator 4), for example. However, it is necessary to provide a gap between the rotor 3 and the stator 4. In view of this, in this case, the size in the axial direction increases in comparison with the axial gap motor 1 of the present embodiment just by a gap to be provided between the first stator 4 and the second rotor 3. Further, in a case where the rotors 3 and the stators 4 are placed alternately along the axial direction, the gravitational center of the axial gap motor 1 is placed at a position deviating from the center of the case 5 in the axial direction. However, in the axial gap motor 1 of the present embodiment, it is possible to reduce the deviation of the gravitational center from the center of the case 5.

Note that it should be considered that the embodiment disclosed herein is just an example in all respects and is not limitative. The scope of the present disclosure is shown by Claims, not by the descriptions of the above embodiment, and includes every modification made within the meaning and scope equivalent to Claims.

For example, the above embodiment deals with an example in which the axial gap motor is constituted by two rotors and two stators. However, the present disclosure is not limited to this, and the axial gap motor may be constituted by use of one rotor and one stator, for example. Note that, in a case where two rotors and two stators are provided, output torque with respect to a motor size can be improved in comparison with a case where one rotor and one stator are provided. Further, the axial gap motor may be constituted by use of three or more rotors and three or more stators in accordance with necessary torque. In this case, as described in the above embodiment, from the viewpoint of bending of the rotor pedestals, the size of the axial gap motor in the axial direction, and the deviation of the gravitational center, it is preferable that a configuration in which two rotors are sandwiched between two stators be taken as one configuration unit, and a plurality of configuration units be provided.

Further, the above embodiment deals with an example in which the rotor cores of two rotors are fixed to each other. However, the present disclosure is not limited to this, and the rotor cores of the two rotors may not be fixed to each other.

Further, the above embodiment deals with an example in which 8 rotor cores and 24 stator cores are provided. However, the present disclosure is not limited to this. The number of rotor cores and the number of stator cores can be variously combined. For example, 16 rotor cores and 24 stator cores may be provided. Further, the number of rotor cores may be larger than the number of stator cores.

Further, the above embodiment deals with an example in which the rotor cores corresponding to each other in the two rotors are placed at the same angular position, and the stator cores corresponding to each other in the two stators are placed at the same angular position. However, the present disclosure is not limited to this. The stator cores (or the rotor cores) corresponding to each other in the two stators (or two rotors) may be placed at different angular positions. For example, in the two stators, the stator cores corresponding to each other may be placed to deviate from each other by half of an angular pitch (7.5° in the above embodiment). By shifting the angular positions from each other, it is possible to restrain torque fluctuation (also referred to as torque ripple).

Further, in the above embodiment, a bearing member may be provided between the outer peripheral edge of the rotor pedestal and the inner surface of the side face portion of the case or between the inner surface of the insertion hole of the stator pedestal and an outer peripheral surface of the rotary shaft. With such a configuration, even in a case where the rotor or the like is decentered, it is possible to restrain vibration caused by the decentration.

What is claimed is:

1. An axial gap motor comprising:
a rotor fixed to a rotary shaft; and
a stator placed to face the rotor via a gap in an axial direction of the rotary shaft, wherein:
the rotor includes a rotor pedestal made of a nonmagnetic material, and a plurality of rotor cores fixed along a circumferential direction of the rotor pedestal and a plurality of magnets fixed along the circumferential direction of the rotor pedestal;
the stator includes a stator pedestal made of a nonmagnetic material, a plurality of stator cores fixed along a circumferential direction of the stator pedestal, and coils wound around the stator cores;
the rotor cores and the stator cores are arranged to face each other in a rotational axis direction of the rotor;
the rotor cores and the stator cores are cores each made of a soft magnetic material curved such that two end surfaces face the same direction;
two end surfaces of each of the rotor cores are placed to face two end surfaces of a corresponding one of the stator cores;

the magnets are each placed such that an N-pole and an S-pole are arranged in a thickness direction of the rotor pedestal;

one of the two end surfaces of the each of the rotor cores faces the N-pole of a corresponding one of the magnets; and the other one of the two end surfaces of the each of the rotor cores faces the S-pole of a corresponding one of the magnets.

2. The axial gap motor according to claim 1, wherein:

the rotor includes two rotors;

the stator includes two stators;

the two rotors are placed between the two stators in the axial direction of the rotary shaft; and parts of respective rotor cores of the two rotors are fixed to each other, the parts being on respective sides opposite to respective end surfaces of the respective rotor cores.

3. The axial gap motor according to claim 1, wherein:

the rotor cores and the stator cores are cores each having the two end surfaces formed by dividing a winding body in a direction intersecting with a circumferential direction of the winding body, the winding body being formed by winding a belt-shaped soft magnetic material several times; and the belt-shaped soft magnetic material is made of a directional electromagnetic steel sheet in which crystals are oriented in a longitudinal direction of the belt-shaped soft magnetic material.

4. The axial gap motor according to claim 1, wherein:

the rotor core has first and second divided surfaces, the N-pole of at least one of the magnets are placed on the first divided surface and the S-pole of at least one of the magnets are placed on the second divided surface.

* * * * *